US012561535B2

(12) United States Patent
Park et al.

(10) Patent No.: US 12,561,535 B2
(45) Date of Patent: Feb. 24, 2026

(54) ELECTRONIC APPARATUS FOR REAL-TIME CONVERSATION INTERPRETATION AND METHOD FOR CONTROLLING THE SAME

(71) Applicant: SAMSUNG ELECTRONICS CO., LTD., Suwon-si (KR)

(72) Inventors: Soyoon Park, Suwon-si (KR); Sungjun Lim, Suwon-si (KR); Jonghyun Kim, Suwon-si (KR); Jiwan Kim, Suwon-si (KR); Hakjung Kim, Suwon-si (KR); Hyunkyung Kim, Suwon-si (KR); Sohyun Park, Suwon-si (KR); Indong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 231 days.

(21) Appl. No.: 18/221,190

(22) Filed: Jul. 12, 2023

(65) Prior Publication Data

US 2023/0351126 A1     Nov. 2, 2023

Related U.S. Application Data

(63) Continuation of application No. PCT/KR2022/015500, filed on Oct. 13, 2022.

(30) Foreign Application Priority Data

Oct. 15, 2021     (KR) ........................ 10-2021-0137308
Apr. 18, 2022     (KR) ........................ 10-2022-0047438

(51) Int. Cl.
*G06F 40/58*          (2020.01)

(52) U.S. Cl.
CPC .................................. *G06F 40/58* (2020.01)

(58) Field of Classification Search
CPC .......... G10L 15/22; G10L 15/26; G06F 40/58
See application file for complete search history.

(56) References Cited

U.S. PATENT DOCUMENTS 9,479,911 B2     10/2016  Kang et al.
9,614,969 B2     4/2017  Aue et al.
(Continued)

FOREIGN PATENT DOCUMENTS

CN          111368559 A      7/2020
KR      10-2018-0005850 A      1/2018
(Continued)

OTHER PUBLICATIONS

Shen, Yantao, et al. "Towards backward-compatible representation learning." Proceedings of the IEEE/CVF Conference on Computer Vision and Pattern Recognition. 2020. (Year: 2020).*

(Continued)

*Primary Examiner* — Jialong He
(74) *Attorney, Agent, or Firm* — Sughrue Mion, PLLC

(57)          ABSTRACT

Provided is an electronic apparatus that includes a microphone; a communication interface; a memory storing information on a first encoder, a first decoder, a first interpretation model comprising a first version conversion module, and at least one first version which the first conversion module may convert; and a processor. The processor is configured to communicate with an external device and receive information about at least one second version corresponding to a second interpretation model in the external device; obtain information on a compatible version based the at least one first version and the least one second version; based on a user voice, obtain a first feature vector corresponding to the user voice using the first encoder, convert the first feature (Continued)

vector to a second feature vector corresponding to the compatible version, and transmit the second feature vector to the external device.

18 Claims, 14 Drawing Sheets

(56) References Cited

U.S. PATENT DOCUMENTS

| | | | |
|---|---|---|---|
| 9,786,296 B2 | 10/2017 | Kim et al. | |
| 10,268,471 B2 | 4/2019 | Ang et al. | |
| 10,509,864 B2 | 12/2019 | Kang et al. | |
| 10,867,136 B2 | 12/2020 | Lee et al. | |
| 10,891,446 B2 | 1/2021 | Hodge | |
| 11,314,951 B2 | 4/2022 | Kim et al. | |
| 11,586,831 B2 | 2/2023 | Wang et al. | |
| 11,776,557 B2 | 10/2023 | Yun et al. | |
| 2014/0242955 A1 | 8/2014 | Kang et al. | |
| 2015/0012279 A1 | 1/2015 | Kim et al. | |
| 2018/0011843 A1 | 1/2018 | Lee et al. | |
| 2018/0373704 A1* | 12/2018 | Lee | G06F 40/53 |
| 2019/0163747 A1 | 5/2019 | Kang et al. | |
| 2020/0104372 A1 | 4/2020 | Xiong et al. | |
| 2020/0194000 A1 | 6/2020 | Nan et al. | |
| 2020/0387676 A1 | 12/2020 | Kim et al. | |
| 2020/0394082 A1* | 12/2020 | Schreiner | G06F 9/541 |
| 2021/0271826 A1 | 9/2021 | Wang et al. | |
| 2021/0312143 A1* | 10/2021 | Trehan | H04M 3/42 |
| 2021/0312938 A1 | 10/2021 | Yun et al. | |
| 2023/0013777 A1* | 1/2023 | Jia | G06F 40/58 |

FOREIGN PATENT DOCUMENTS

| | | | |
|---|---|---|---|
| KR | 10-2018-0060903 A | 6/2018 | |
| KR | 10-1922782 B1 | 11/2018 | |
| KR | 10-2019-0064181 A | 6/2019 | |
| KR | 10-2108500 B1 | 5/2020 | |
| KR | 10-2021-0004854 A | 1/2021 | |
| KR | 10-2021-0019920 A | 2/2021 | |
| KR | 10-2021-0124050 A | 10/2021 | |
| WO | 2006/083690 A2 | 8/2006 | |

OTHER PUBLICATIONS

Written Opinion (PCT/ISA/237) issued Jan. 26, 2023 from the International Searching Authority in International Application No. PCT/KR2022/015500.

International Search Report (PCT/ISA/210) issued Jan. 26, 2023 from the International Searching Authority in International Application No. PCT/KR2022/015500.

Communication issued on Sep. 19, 2024 by the European Patent Office for European Patent Application No. 22881373.9.

* cited by examiner

FIG. 14

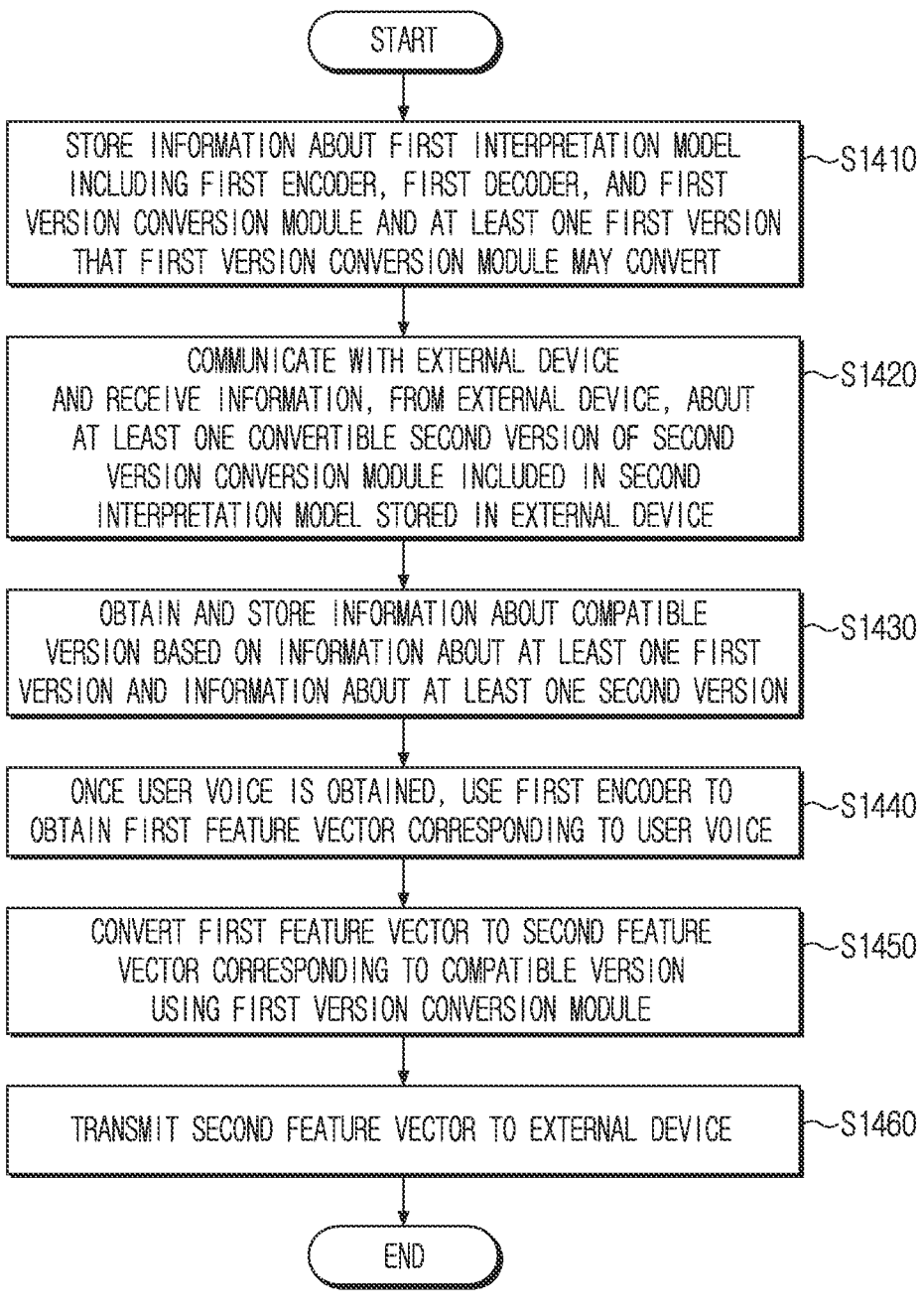

START

STORE INFORMATION ABOUT FIRST INTERPRETATION MODEL
INCLUDING FIRST ENCODER, FIRST DECODER, AND FIRST
VERSION CONVERSION MODULE AND AT LEAST ONE FIRST VERSION
THAT FIRST VERSION CONVERSION MODULE MAY CONVERT ~S1410

COMMUNICATE WITH EXTERNAL DEVICE
AND RECEIVE INFORMATION, FROM EXTERNAL DEVICE, ABOUT
AT LEAST ONE CONVERTIBLE SECOND VERSION OF SECOND
VERSION CONVERSION MODULE INCLUDED IN SECOND
INTERPRETATION MODEL STORED IN EXTERNAL DEVICE ~S1420

OBTAIN AND STORE INFORMATION ABOUT COMPATIBLE
VERSION BASED ON INFORMATION ABOUT AT LEAST ONE FIRST
VERSION AND INFORMATION ABOUT AT LEAST ONE SECOND VERSION ~S1430

ONCE USER VOICE IS OBTAINED, USE FIRST ENCODER TO
OBTAIN FIRST FEATURE VECTOR CORRESPONDING TO USER VOICE ~S1440

CONVERT FIRST FEATURE VECTOR TO SECOND FEATURE
VECTOR CORRESPONDING TO COMPATIBLE VERSION
USING FIRST VERSION CONVERSION MODULE ~S1450

TRANSMIT SECOND FEATURE VECTOR TO EXTERNAL DEVICE ~S1460

END

ELECTRONIC APPARATUS FOR REAL-TIME CONVERSATION INTERPRETATION AND METHOD FOR CONTROLLING THE SAME

CROSS-REFERENCE TO RELATED APPLICATIONS

This application is a bypass continuation of PCT International Application No. PCT/KR2022/015500, which was filed on Oct. 13, 2022, and claims priority to Korean Patent Application No. 10-2021-0137308 filed on Oct. 15, 2021, and Korean Patent Application No. 10-2022-0047438 filed on Apr. 18, 2022, in the Korean Intellectual Property Office, the disclosures of which are incorporated herein by reference in their entireties.

BACKGROUND

1. Field

The disclosure relates to an electronic apparatus providing a real-time interpretation function during conversation via phone with a counterpart and a method for controlling thereof.

2. Description of Related Art

In recent years, artificial intelligence (AI) systems have been used in various fields. An AI system is a system in which a machine learns, judges, and becomes smart, unlike an existing rule-based smart system. As the use of AI systems improves, a recognition rate and understanding or anticipation of a user's taste may be performed more accurately. As such, existing rule-based smart systems are gradually being replaced by deep learning-based AI systems.

AI technology is composed of machine learning (deep learning) and elementary technologies which utilizes machine learning. Machine learning is an algorithm technology that is capable of classifying or learning characteristics of input data. Elementary technologies include technology that simulates functions such as recognition and judgment of a human brain using machine learning algorithms such as deep learning. Machine learning is composed of technical fields such as linguistic understanding, visual understanding, reasoning, prediction, knowledge representation, motion control, or the like. In particular, the language understanding is a technology of recognizing and applying human language/character, including natural language processing, machine translation, dialogue system, query response, voice recognition/synthesis, and the like.

Recently, an electronic apparatus for providing a real-time interpretation function based on an artificial intelligence system is used. A conventional electronic apparatus transmits utterance corresponding to the translated counterpart language to a counterpart device based on the user's utterance. For this, a conventional electronic apparatus needs to be stored with a trained encoder and decoder corresponding to languages of each country. For example, if the user is a Korean and the counterpart is an American, an encoder for encoding a Korean sentence and a decoder for generating an English sentence based on the encoded data need to be stored in an electronic apparatus. Therefore, as the number of languages provided by the interpretation service increases, the size of the interpretation model increases, which leads to a problem that the interpretation service is difficult to be applied to the mobile device in which the memory capacity is limited. For example, when an electronic apparatus supports 100 languages, 100 encoders and 100 decoders are needed.

Therefore, there is a necessity of technology to lighten (e.g., reduce a memory capacity needed to store) an interpretation model stored in an electronic apparatus.

SUMMARY

Provided are systems and methods to lighten an interpretation model stored in an electronic apparatus.

Further provided are systems and methods that can provide interpretation functions even when a version of the interpretation model is different with a counterpart device.

The technical challenges of the disclosure are not limited to the technical challenges mentioned above, and other technical challenges not mentioned will be clearly understood by ordinary skill in the art of the disclosure from the following description.

An electronic apparatus according to an embodiment includes a microphone; a communication interface including communication circuitry; a memory storing information on a first encoder, a first decoder, a first interpretation model including a first version conversion module, and at least one first version which the first conversion module is able to convert; and a processor configured to: communicate, via the communication interface, with an external device and receive, from the external device, information about at least one second version which a second version conversion module included in a second interpretation model stored in the external device is able to convert, obtain information on a compatible version based on information about the at least one first version and information about the least one second version and store the information in the memory, based on a user voice being obtained through the microphone, obtain a first feature vector corresponding to the user voice using the first encoder, convert the first feature vector to a second feature vector corresponding to the compatible version using the first version conversion module, and transmit, via the communication interface, the second feature vector to the external device.

The processor may be further configured to identify a highest version included in both the at least one first version and the at least one second version as the compatible version.

Based on a highest version among the at least one first version being lower than a highest version among the at least one second version, a version of the first feature vector and a version of the second feature vector may be identical.

A version of the first encoder and a version of the first decoder may be a highest version among the at least one first version.

The processor may be further configured to receive, from the external device, a third feature vector corresponding to a voice of a second user obtained by the external device and is based on the compatible version, determine whether the version of the first decoder is identical with the compatible version, and obtain a text corresponding to the voice of the second user based on the determination result.

The processor may be further configured to, based on the version of the first decoder being identical with the compatible version, obtain a text corresponding to the third feature vector using the first decoder, based on the version of the first decoder being different from the compatible version, convert the third feature vector to a fourth feature vector corresponding to the version of the first decoder using the first version conversion module, and obtain a text corresponding to the fourth feature vector using the first decoder.

The processor may be further configured to determine compatibility with the external device by comparing the information about the at least one first version and the information about the at least one second version, and based on determining that the electronic apparatus is not compatible with the external device, output a message requesting update of the first interpretation model.

The processor may be further configured to, based on communication with the external device, receive identification information of the external device, and match identification information of the external device with information of the compatible version and store the information in the memory.

According to an embodiment, a method for controlling an electronic apparatus includes storing information on a first encoder, a first decoder, a first interpretation model including a first version conversion module, and at least one first version which the first conversion module is able to convert; communicating with an external device and receiving, from the external device, information about at least one second version which a second version conversion module included in a second interpretation model stored in the external device is able to convert; obtaining information on a compatible version based on information about the at least one first version and information about the least one second version and storing the information in the memory; based on a user voice being obtained, obtaining a first feature vector corresponding to the user voice using the first encoder; converting the first feature vector to a second feature vector corresponding to the compatible version using the first version conversion module; and transmitting the second feature vector to the external device.

The obtaining information on a compatible version may include identifying a highest version included in both the at least one first version and the at least one second version as the compatible version.

The method may further include: receiving, from the external device, a third feature vector corresponding to a voice of a second user obtained by the external device and is based on the compatible version; determining whether the version of the first decoder is identical with the compatible version; and obtaining a text corresponding to the voice of the second user based on the determination result.

The obtaining the text may include, based on the version of the first decoder being identical with the compatible version, obtaining a text corresponding to the third feature vector using the first decoder; based on the version of the first decoder being different from the compatible version, converting the third feature vector to a fourth feature vector corresponding to the version of the first decoder using the first version conversion module, and obtaining a text corresponding to the fourth feature vector using the first decoder.

The method may further: include determining compatibility with the external device by comparing the information about the at least one first version and the information about the at least one second version; and based on determining that the electronic apparatus is not compatible with the external device, outputting a message requesting update of the first interpretation model.

The method may further include, based on communication with the external device, receiving identification information of the external device, and matching identification information of the external device with information of the compatible version and storing the information.

According to an embodiment, a non-transitory computer readable medium for storing computer readable program code or instructions for carrying out operations, when executed by a processor, includes operations for providing real-time interpretation during a conversation. The operations include: storing information on a first encoder, a first decoder, a first interpretation model including a first version conversion module, and at least one first version which the first conversion module is able to convert; communicating with an external device and receiving, from the external device, information about at least one second version which a second version conversion module included in a second interpretation model stored in the external device is able to convert; obtaining information on a compatible version based on information about the at least one first version and information about the least one second version and storing the information; based on a user voice being obtained, obtaining a first feature vector corresponding to the user voice using the first encoder; converting the first feature vector to a second feature vector corresponding to the compatible version using the first version conversion module; and transmitting the second feature vector to the external device.

The operation of obtaining information on a compatible version comprises identifying a highest version included in both the at least one first version and the at least one second version as the compatible version.

The operations further comprise: receiving, from the external device, a third feature vector corresponding to a voice of a second user obtained by the external device and is based on the compatible version; determining whether the version of the first decoder is identical with the compatible version; and obtaining a text corresponding to the voice of the second user based on the determination result.

The operation of obtaining the text comprises: based on the version of the first decoder being identical with the compatible version, obtaining a text corresponding to the third feature vector using the first decoder; based on the version of the first decoder being different from the compatible version, converting the third feature vector to a fourth feature vector corresponding to the version of the first decoder using the first version conversion module, and obtaining a text corresponding to the fourth feature vector using the first decoder.

The operations further comprise: determining compatibility with the external device by comparing the information about the at least one first version and the information about the at least one second version; and based on determining that the external device is not compatible, outputting a message requesting update of the first interpretation model.

The means for solving the task of the disclosure are not limited to the above-described solving means, and it will be apparent to a person skilled in the art to which the disclosure belongs from the specification and the appended drawings.

Other aspects, advantages and distinctive features of the disclosure will become apparent to those skilled in the art from the following detailed description of various embodiments in association with the accompanying drawing.

BRIEF DESCRIPTION OF THE DRAWINGS

The above and other aspects, and advantages of certain embodiments of the disclosure will be more apparent from the following description taken in conjunction with the accompanying drawings, in which:

FIG. 14 is a flowchart illustrating a method of controlling an electronic apparatus according to an embodiment of the disclosure.

DETAILED DESCRIPTION

Figure 1:
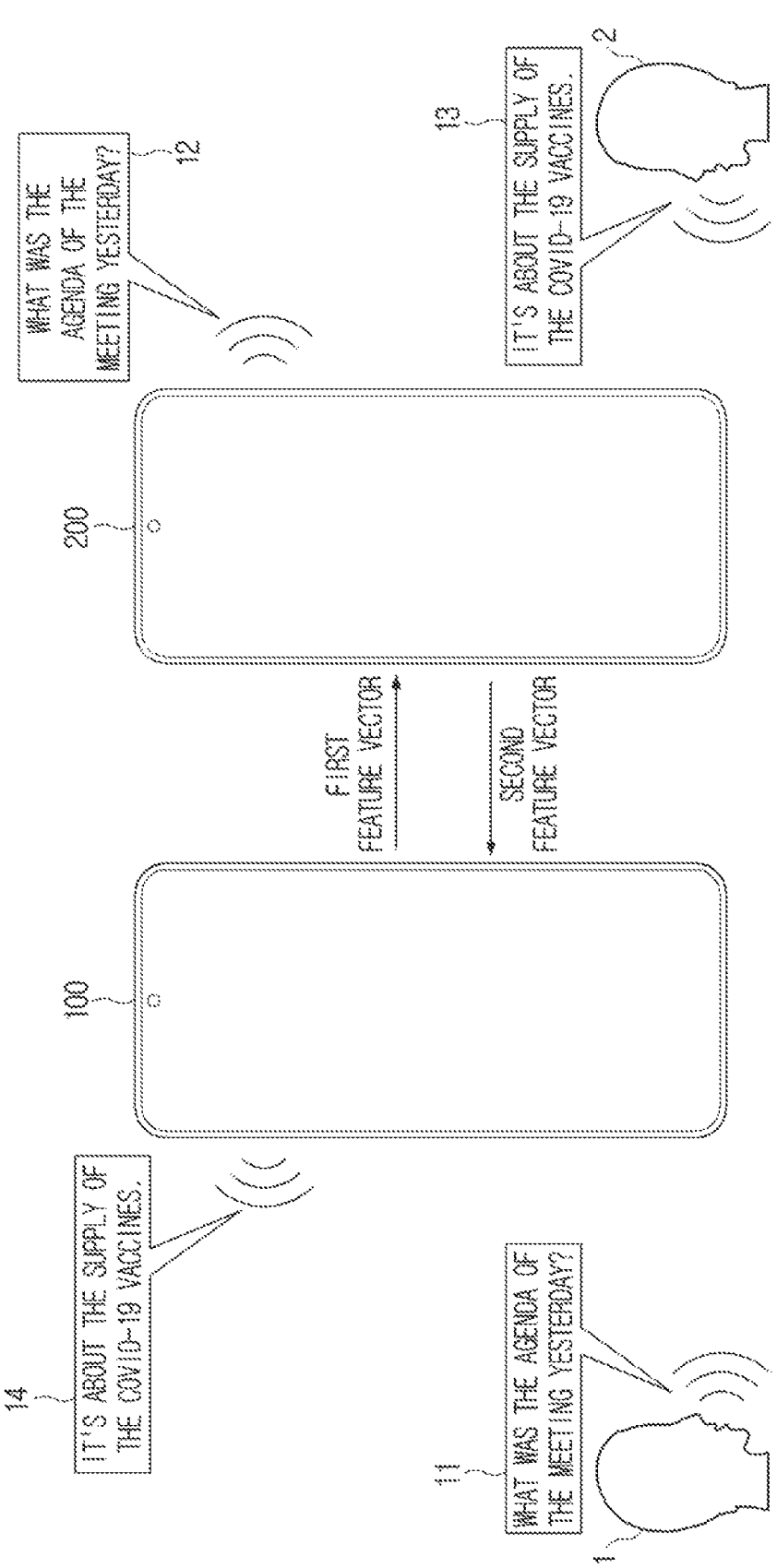
FIG. 1 is a diagram illustrating an operation of an electronic apparatus according to an embodiment of the disclosure.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

One or more specific embodiments of the disclosure are illustrated in the drawings and are described in detail in the detailed description. However, it is to be understood that the disclosure is not limited to the one or more specific embodiments, but includes all modifications, equivalents, and substitutions without departing from the scope and spirit of the disclosure. Also, well-known functions or constructions are not described in detail since they would obscure the disclosure with unnecessary detail.

As used herein, the terms "first," "second," or the like may identify corresponding components, regardless of importance of order, and are used to distinguish a component from another without limiting the components.

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

Embodiments of the disclosure will be described in detail with reference to the accompanying drawings to aid in the understanding of those of ordinary skill in the art. However, the disclosure may be realized in various different forms and it should be noted that the disclosure is not limited to the various embodiments described herein. Further, in the drawings, parts not relevant to the description may be omitted, and like reference numerals may be used to indicate like elements.

FIG. 1 is a diagram illustrating an operation of an electronic apparatus according to an embodiment of the disclosure.

Referring to FIG. 1, a user 1 of an electronic apparatus 100 may communicate with a user 2 of an external device 200. The user 1 may talk in a first language (e.g., Korean) and the user 2 may talk in a second language (e.g., English). At this time, the electronic apparatus 100 may provide a simultaneous interpretation function. For example, the electronic apparatus 100 may obtain voice 11 of the user 1 of the first language. The electronic apparatus 100 may obtain a first feature vector corresponding to the voice 11 of the user 1 and transmit the first feature vector to the external device 200.

The external device 200 may obtain and output a voice 12 of a second language corresponding to the voice 11 of the user 1 based on the first feature vector. The external device 200 may obtain voice 13 of the user 2 of the second language responding to output voice 12. The external device 200 may obtain a second feature vector corresponding to the voice 13 of the user 2 and transmit the second feature vector to the electronic apparatus 100. The electronic apparatus 100 may obtain and output a voice 14 of a first language corresponding to the voice 13 of the user 2 based on the second feature vector.

Figure 2:
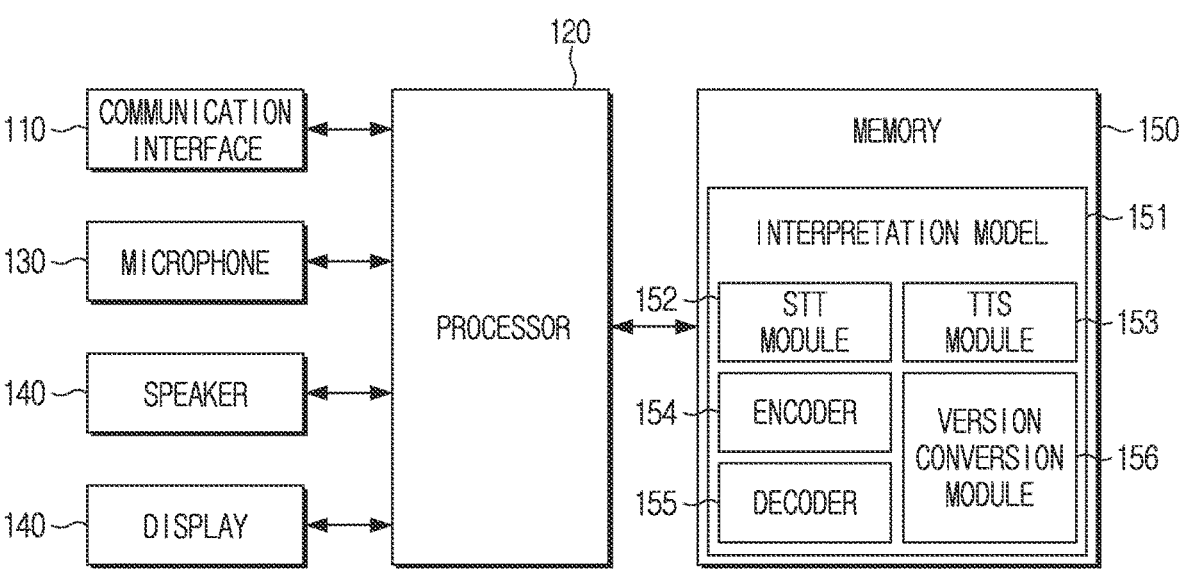
FIG. 2 is a block diagram illustrating a configuration of an electronic apparatus according to an embodiment of the disclosure.

FIG. 2 is a block diagram of the electronic apparatus according to an embodiment of the disclosure. Referring to FIG. 2, the electronic apparatus 100 may include a communication interface 110, a microphone 120, a speaker 130, a display 140, a memory 150, and a processor 160. The memory 150 may store an interpretation model 151. The interpretation model 151 may store a speech-to-text (STT) module 152, a text-to-speech (TTS) module 153, an encoder 154, a decoder 155, and a version conversion module 156.

The communication interface 110 may include at least one communication circuit and may communicate with various types of external devices or external servers. For example, the communication interface 110 may transmit a feature vector corresponding to a voice of a user of the electronic apparatus 100 to an external device 200 or may receive a feature vector corresponding to a voice of a user 2 of the external device 200. Alternatively, the communication interface 110 may transmit the identification information of the electronic apparatus 100 and version information of the version conversion module 156 to an external device 200. In addition, the communication interface 110 may receive the identification information of the external device 200 and version information of the version conversion module stored in the external device 200 from the external device 200.

The communication interface 110 may include at least one of a Wi-Fi communication module, a cellular communication module, a 3rd generation (3G) mobile communication module, a fourth generation (4G) long term evolution (LTE) communication module, a 5th generation (5G) communication module, or the like.

The microphone 120 may receive the user voice 11 in an active state. For example, the microphone 120 may be integrally formed as an integral unit on an upper side, a front side direction, a side direction, or the like of the electronic apparatus 100. The microphone 120 may include various configurations such as a microphone for collecting user voice 11 in an analog format, an amplifier circuit for amplifying the collected user voice 11, an audio-to-digital (A/D) conversion circuit for sampling the amplified user voice 11 to convert into a digital signal, a filter circuitry for removing a noise element from the converted digital signal, or the like.

The speaker 130 may output a voice. For example, the speaker 130 may output a voice generated based on the feature vector received from an external device 200.

The display 140 may display text corresponding to the user voice 11. Alternatively, the display 140 may display a guide message. For example, if the version of the interpretation model 151 is lower than the version of the interpretation model of the external device 200 and there is no compatibility, the display 140 may display a guide message requesting the update of the interpretation model 151. Alternatively, the display 140 may output a guide message indicating that there is no compatibility with the external device 200.

The display 140 may be implemented as a liquid crystal display panel (LCD), organic light emitting diode (OLED) display, or the like, and the display 140 may be implemented as a flexible display, a transparent display, or the like. The display 140 according to the disclosure is not limited to a specific type.

The memory 150 may store instructions or data associated with an operating system (OS) for controlling the overall operation of components of the electronic apparatus 100 and components of the electronic apparatus 100. The memory 150 may store the interpretation model 151 and the version information of the interpretation model 151. The version information of the interpretation model 151 may include information about the version of the encoder 154, the version of the decoder 155, and the at least one version which the version conversion module 156 may convert. The memory 150 may be implemented as a non-volatile memory (e.g., a hard disk, a solid state drive (SSD), a flash memory), a volatile memory, and the like.

The processor 160 may be electrically connected to the memory 150 to control the overall functions and operations of the electronic apparatus 100. The processor 160 may load, into the volatile memory, data for performing various operations by the interpretation model 151 stored in the non-volatile memory. Here, the loading refers to the operation of loading and storing data stored in the non-volatile memory into the volatile memory so that the processor 160 may access.

The processor 160 may perform a communication connection with an external device 200. When the communication connection is performed, the processor 160 may receive, from the external device 200, information about the at least one second version which the second version conversion module included in the second interpretation model stored in the external device 200 may convert. The processor 160 may obtain information about the at least one first version which the version conversion module 156 stored in the memory 150 may convert.

The processor 160 may determine compatibility with an external device 200 based on information about at least one first version the version conversion module 156 may convert, and information about at least one second version the version conversion module in the external device 200 may convert. The compatibility with the external device 200 refers to the compatibility of the first interpretation model (e.g., the interpretation model 151) and the second interpretation model of the external device 200. For example, the processor 160 may determine whether the same version as at least one second version of the at least one first version exists. That is, it is possible to determine whether there is a common version of at least one first version and at least one second version. If the same version is present, the processor 160 may determine that there is a compatibility between the first interpretation model and the second interpretation model. If the same version is not present, the processor 160 may determine that there is no compatibility between the first interpretation model and the second interpretation model.

If there is no compatibility with the external device 200, the processor 160 may control display 140 to output a guide message. For example, the guide message may include a message indicating that there is no compatibility and a message requesting an update of the interpretation model 151. When a user voice 11 is obtained through the microphone 120, the processor 160 may control the communication interface 110 to transmit the user voice 11 to an external device 200. When the voice 13 of the user 2 of the external device 200 is received from the external device 200, the processor 160 may control the speaker 130 to output the user's voice of the external device 200.

If there is compatibility with an external device 200, the processor 160 may identify a compatible version based on the information about the at least one first version and information about the at least one second version. For example, the processor 160 may identify a lower version between a highest version among the at least one first version and a highest version among the at least one second version as the compatible version. The compatible version may refer to a version corresponding to a feature vector transmitted or received between the electronic apparatus 100 and the external device 200.

When the user voice 11 is obtained, the processor 160 may input the user voice 11 to the STT module 152 to obtain text corresponding to the user voice 11. The processor 160 may then input the obtained text to the encoder 154 to obtain a first feature vector corresponding to the user voice 11. The processor 160 may obtain a second feature vector based on the version and compatible version of the encoder 154. If the version of the encoder 154 and the compatible version are different, the processor 160 may convert the first feature vector to a second feature vector corresponding to the compatible version using the version conversion module 156. If the version of encoder 154 is the same compatible version, processor 160 may have the same first feature vector and a second feature vector. The processor 160 may transmit a second feature vector to an external device 200.

The processor 160 may receive, from the external device 200, a third feature vector corresponding to the voice 13 of the user 2 of the external device 200 and based on a compatible version. The processor 160 may determine whether the version of decoder 155 is the same as the compatible version. If the version of the decoder 155 is the same as the compatible version, the processor 160 may use the decoder 155 to obtain text corresponding to the third feature vector. The processor 160 may control the speaker 130 to input the obtained text to the TTS module 153 to obtain voice and output the obtained voice.

If the version of decoder 155 differs from the compatible version, the processor 160 may use version conversion module 156 to convert the third feature vector to a fourth feature vector corresponding to the version of decoder 155. The processor 160 may use the decoder 155 to obtain text corresponding to the fourth feature vector. The processor 160 may obtain the voice by inputting the obtained text to the TTS module 153 and may control the speaker 130 to output the obtained voice.

A function related to AI is operated through the processor 160 and the memory 150. The processor 160 may include one or a plurality of processors 140. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the memory 150. If one or a plurality of processors are AI-dedicated processor, the AI-dedicated processor may be designed with a hardware structure specialized for processing of a specific AI model.

The predefined operating rule or artificial intelligence model is provided through training or learning. Being provided through learning may refer, for example, to, by applying a learning algorithm to a plurality of learning data, a predefined operating rule or AI model of a desired characteristic being made. The learning may be performed in a device itself in which AI according to an embodiment is performed, and/or may be implemented through a separate server/system. Examples of learning algorithms include, but are not limited to, supervised learning, unsupervised learning, semi-supervised learning, or reinforcement learning.

The AI model may be made through learning. Here, that the AI model is made through learning may refer that a basic AI model is trained by using a plurality of learning data by the learning algorithm, so that a predefined operating rule or AI model of a desired characteristic (or purpose) is generated. The AI model may include a plurality of neural network layers. Each layer has a plurality of weight values, and performs a layer operation through a result of calculation of a previous layer and an operation of a plurality of weights. A plurality of weights of a plurality of neural network layers may be optimized by a learning result of the AI model. For example, a plurality of weights may be updated to reduce or minimize a loss value or cost value obtained in an AI model during a learning process.

The AI model may be processed by an artificial intelligence dedicated processor designed in a hardware structure specialized for processing an AI model. The artificial intelligence model may be made through learning. Here, it is assumed that a basic artificial intelligence model is learned by using a plurality of learning data by a learning algorithm, thereby creating a predefined action rule or an artificial intelligence model configured to perform a desired characteristic (or purpose). The AI model may include a plurality of neural network layers. Each layer has a plurality of weight values, and performs a layer operation through calculation of a previous layer and an operation of a plurality of weights.

Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

An electronic apparatus 100 may include an adaptive echo canceller (AEC) module, a noise suppression (NS) module, an end-point detection (EPD) module, or an automatic gain control (AGC) module for pre-processing user voice. In addition, the electronic apparatus 100 may include a digital signal processor (DSP) for converting an analog voice signal into a digital signal or changing the stored digital image or the digital voice signal into an analog signal.

Figure 3:
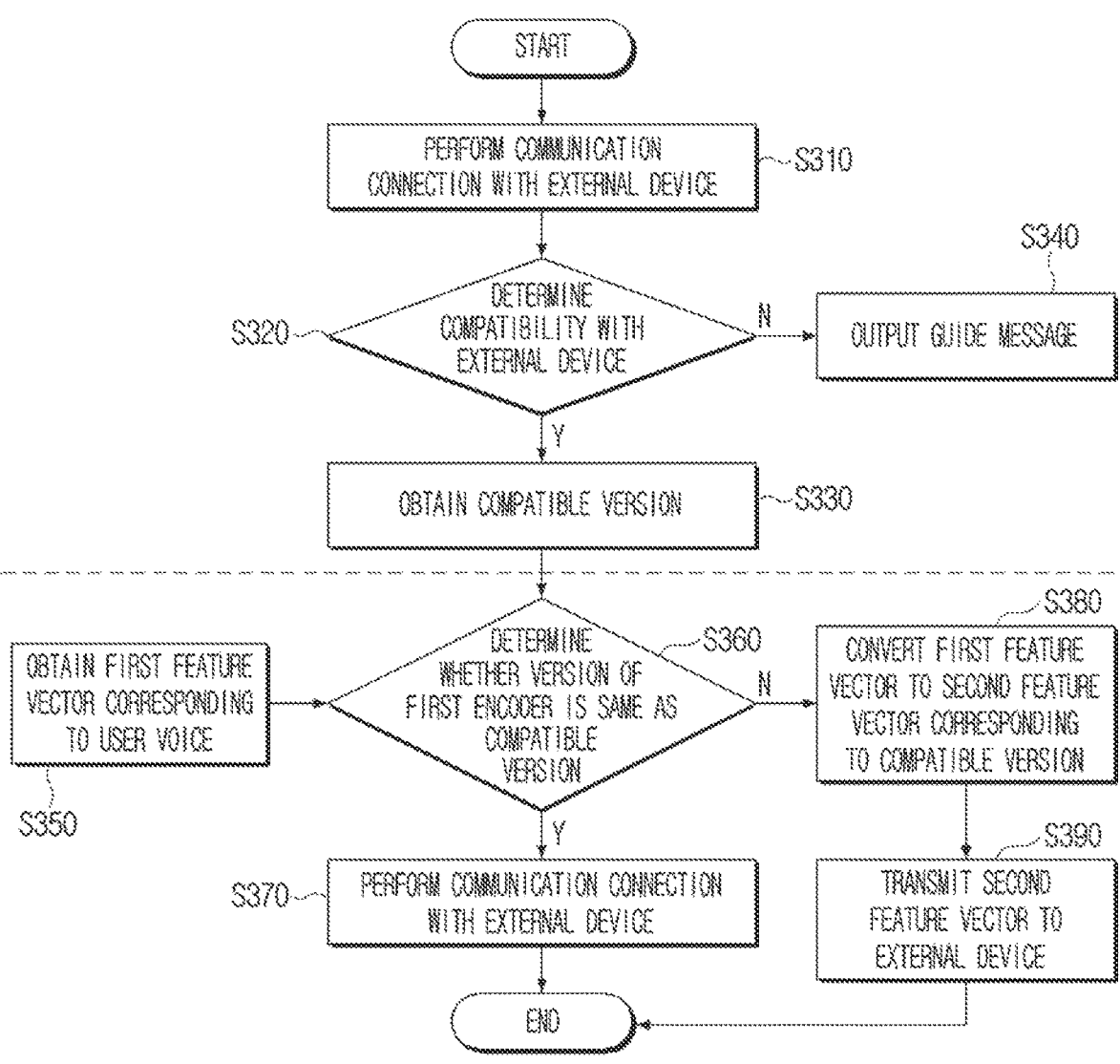
FIG. 3 is a flowchart illustrating an operation of an electronic apparatus as a transmitting device according to an embodiment of the disclosure.

FIG. 3 is a flowchart illustrating an operation of an electronic apparatus as a transmitting device according to an embodiment of the disclosure.

Referring to FIG. 3, the electronic apparatus 100 may perform a communication connection with an external device 200 in operation S310. For example, the electronic apparatus 100 may send a telephone call request to the external device 200 based on a user command, and if the telephone call request is accepted by the external device 200, a communication connection between the electronic apparatus 100 and the external device 200 may be performed. Alternatively, if the electronic apparatus 100 receives a telephone call request from the external device 200, a communication connection between the electronic apparatus 100 and the external device 200 may be performed if the telephone call request is accepted based on the user command.

The electronic apparatus 100 may determine compatibility with the external device 200 in operation S320. Here, compatibility of the electronic apparatus 100 with the external device 200 means compatibility between the first interpretation model stored in the electronic apparatus 100 and the second interpretation model stored in the external device 200. The electronic apparatus 100 may compare information about at least one first version that the first version conversion module stored in the electronic apparatus 100 may convert with information about at least one second version that the second version conversion module stored in the external device 200 may convert. The electronic apparatus 100 may determine whether there is a version equal to the second version of at least one of the at least one first version. If the same version exists, the electronic apparatus 100 may determine that there is compatibility between the first interpretation model and the second interpretation model. If the same version does not exist, the electronic apparatus 100 may determine that there is no compatibility between the first interpretation model and the second interpretation model. For example, at least one first version may include versions 7 to 12, and at least one second version may include versions 3 to version 8. At this time, since versions 7 and 8 are common, the electronic apparatus 100 may determine that there is compatibility between the first interpretation model and the second interpretation model.

If there is compatibility in operation S320-Y, the electronic apparatus 100 may obtain a compatible version in operation S330. The electronic apparatus 100 may obtain a lower version between the highest version of at least one first version and the highest version of at least one second version as a compatible version. For example, at least one first version may include versions 7 to 12, and at least one second version may include versions 3 to version 8. At this time, the electronic apparatus 100 may obtain version 8 between version 12 and version 8 as a compatible version. The electronic apparatus 100 may store the obtained compatible version.

If there is no compatibility in operation S320-N, the electronic apparatus 100 may output a guide message in operation S340. For example, if the version of the first interpretation model is lower than the version of the second interpretation model, the electronic apparatus 100 may output a guide message requesting an update of the first interpretation model. Alternatively, the electronic apparatus 100 may output a guide message informing that there is no compatibility with the external device 200.

The electronic apparatus 100 may obtain a first feature vector corresponding to the user voice 11 in operation S350. The electronic apparatus 100 may input the user voice 11 to the STT module to obtain the text, and input the obtained text to the first encoder to obtain the first feature vector. The electronic apparatus 100 may determine whether the version of the first encoder and the compatible version are the same in operation S360. If the compatible version is the same as the version of the first encoder in operation S360-Y, the electronic apparatus 100 may transmit the first feature vector to an external device 200 in operation S370.

If the version of the first encoder and the compatible version are different in operation S360-N, the electronic apparatus 100 may convert the first feature vector to a second feature vector corresponding to the compatible version in operation S380. The electronic apparatus 100 may input the first feature vector, the information about the version of the first encoder, and information about the compatible version into the first version conversion module to obtain a second feature vector. The electronic apparatus 100 may transmit a second feature vector to the external device 200 in operation S390.

After the communication connection between the electronic apparatus 100 and the external device 200 is performed, S320, S330, and S340 may be performed once. For example, when the electronic apparatus 100 performs a telephone call with an external device 200 after a compatible version is initially obtained, the S320, S330, and S340 may be omitted.

Figure 4:
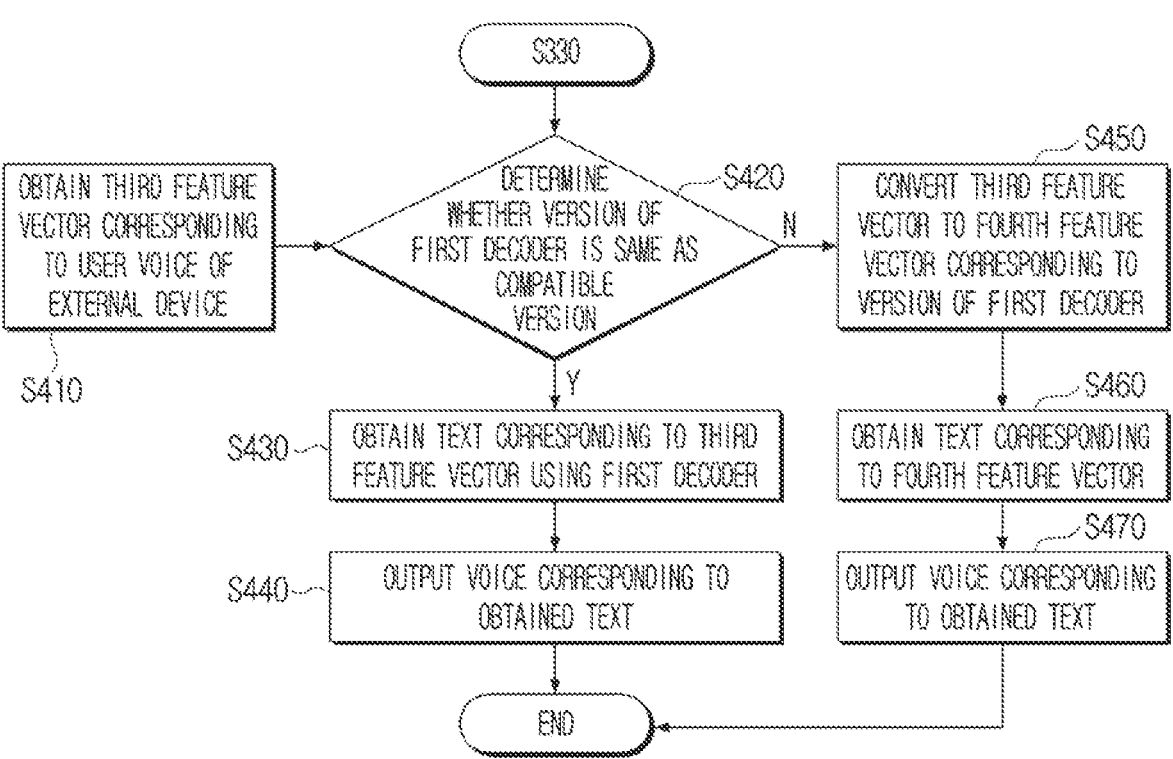
FIG. 4 is a flowchart illustrating an operation of an electronic apparatus as a receiving device according to an embodiment of the disclosure.

FIG. 4 is a flowchart illustrating an operation of an electronic apparatus as a receiving device according to an embodiment of the disclosure. The electronic apparatus 100 may perform the operations S310, S320, S330, and S340 of FIG. 3, but a duplicate description will be omitted.

Referring to FIG. 4, the electronic apparatus 100 may obtain a third feature vector corresponding to the voice 13 of the user 2 of the external device 200 in operation S410. The third feature vector may correspond to a compatible version. The electronic apparatus 100 may determine whether the version of the first decoder included in the first interpretation model and the compatible version are the same in operation S420. If the version of the first decoder and the compatible version are the same in operation S420-Y, the electronic apparatus 100 may use the first decoder to obtain text corresponding to the third feature vector in operation S430 and output a voice corresponding to the obtained text in operation S440. The electronic apparatus 100 may obtain text by inputting a third feature vector into the first decoder, and input the obtained text to a TTS module to obtain a voice.

If the version of the first decoder is different from the compatible version in operation S420-N, the electronic apparatus 100 may convert the third feature vector to a fourth feature vector corresponding to the version of the first decoder in operation S450. The electronic apparatus 100 may input information about the third feature vector, information about the compatible version and the version of the first decoder into the first version conversion module to obtain a fourth feature vector. The electronic apparatus 100 may obtain text corresponding to the fourth feature vector in operation S460 and output a voice corresponding to the obtained text in operation S470.

Figure 5:
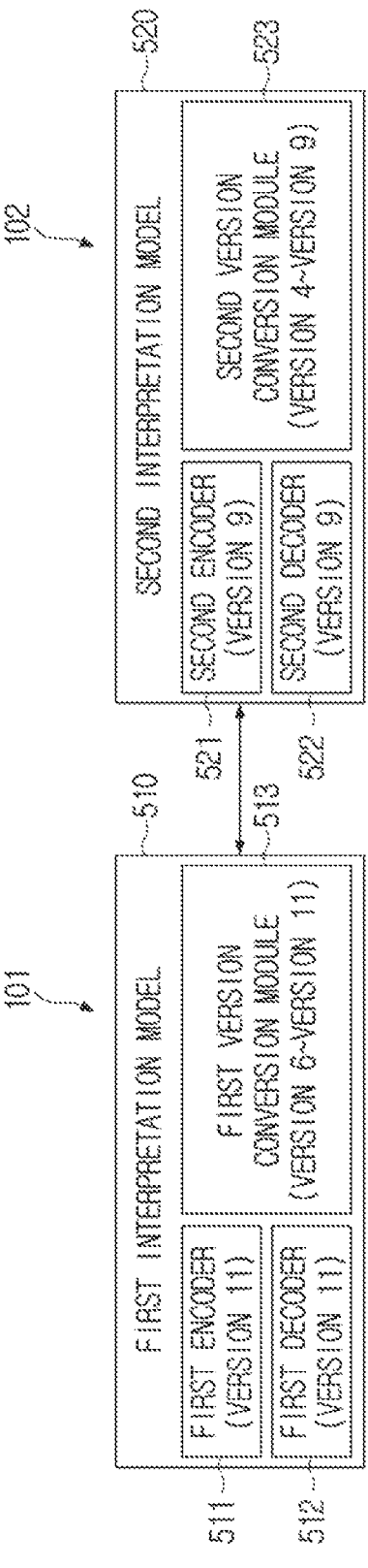
FIG. 5 is a diagram illustrating a method of determining compatibility and a method of obtaining a compatible version according to an embodiment of the disclosure.

FIG. 5 is a diagram illustrating a method of determining compatibility and a method of obtaining a compatible version according to an embodiment of the disclosure.

Referring to FIG. 5, a first electronic apparatus 101 may include a first interpretation model 510. The first interpretation model 510 may include a first encoder 511, a first decoder 512, and a first version conversion module 513. For example, the first version conversion module 513 may convert a feature vector from version 6 to version 11. The versions of the first encoder 511 and the first decoder 512 may be version 11 which is the highest version among the versions which the first version conversion module 513 may convert.

The second electronic apparatus 102 may include a second interpretation model 520. The second interpretation model 520 may include a second encoder 521, a second decoder 522, and a second version conversion module 523. For example, the second version conversion module 523 may convert a feature vector from version 4 to version 9. The versions of the second encoder 521 and the second decoder 522 may be version 9, which is the highest version which the second version conversion module 523 may convert.

The first electronic apparatus 101 and the second electronic apparatus 102 may transmit and receive version information of the interpretation model stored in each apparatus. For example, the first electronic apparatus 101 may transmit information about a plurality of first versions (e.g., versions 6 to versions 11) which the first version conversion module 513 may convert to the second electronic apparatus 102. The second electronic apparatus 102 may transmit information about a plurality of second versions (e.g., versions 4 to version 9) which the second version conversion module 523 may convert to the first electronic apparatus 102.

The first electronic apparatus 101 may determine compatibility between the first interpretation model 510 and the second interpretation model 520. For example, the first electronic apparatus 101 may determine whether there is a common version of the plurality of first versions and a plurality of second versions. If a common version exists, the first electronic apparatus 101 may determine compatibility between the first interpretation model 510 and the second interpretation model 520. Since versions 4, 5, and 6 are common, the first electronic apparatus 101 may determine that there is compatibility between the first interpretation model 510 and the second interpretation model 520.

If it is determined that there is compatibility between the first interpretation model 510 and the second interpretation model 520, the first electronic apparatus 101 may obtain a compatible version. Here, a compatible version means a version corresponding to a feature vector transmitted and received by each electronic apparatus. Each electronic apparatus transmits a feature vector corresponding to a compatible version when transmitting the feature vector to the counterpart device.

The first electronic apparatus 101 may obtain a convertible version based on version information of the second interpretation model 620. For example, the first electronic apparatus 101 may identify a lower version between the highest version among the plurality of first versions which the first version conversion module 513 may convert and the highest version among a plurality of second versions which the second version conversion module 523 may convert, as a convertible version. Referring to FIG. 5, the highest version among the plurality of first versions is version 11 and the highest version among a plurality of second versions is version 9 and thus the electronic apparatus 101 may identify version 9 which is a lower version between version 11 and version 9 as a convertible version.

Figure 6:
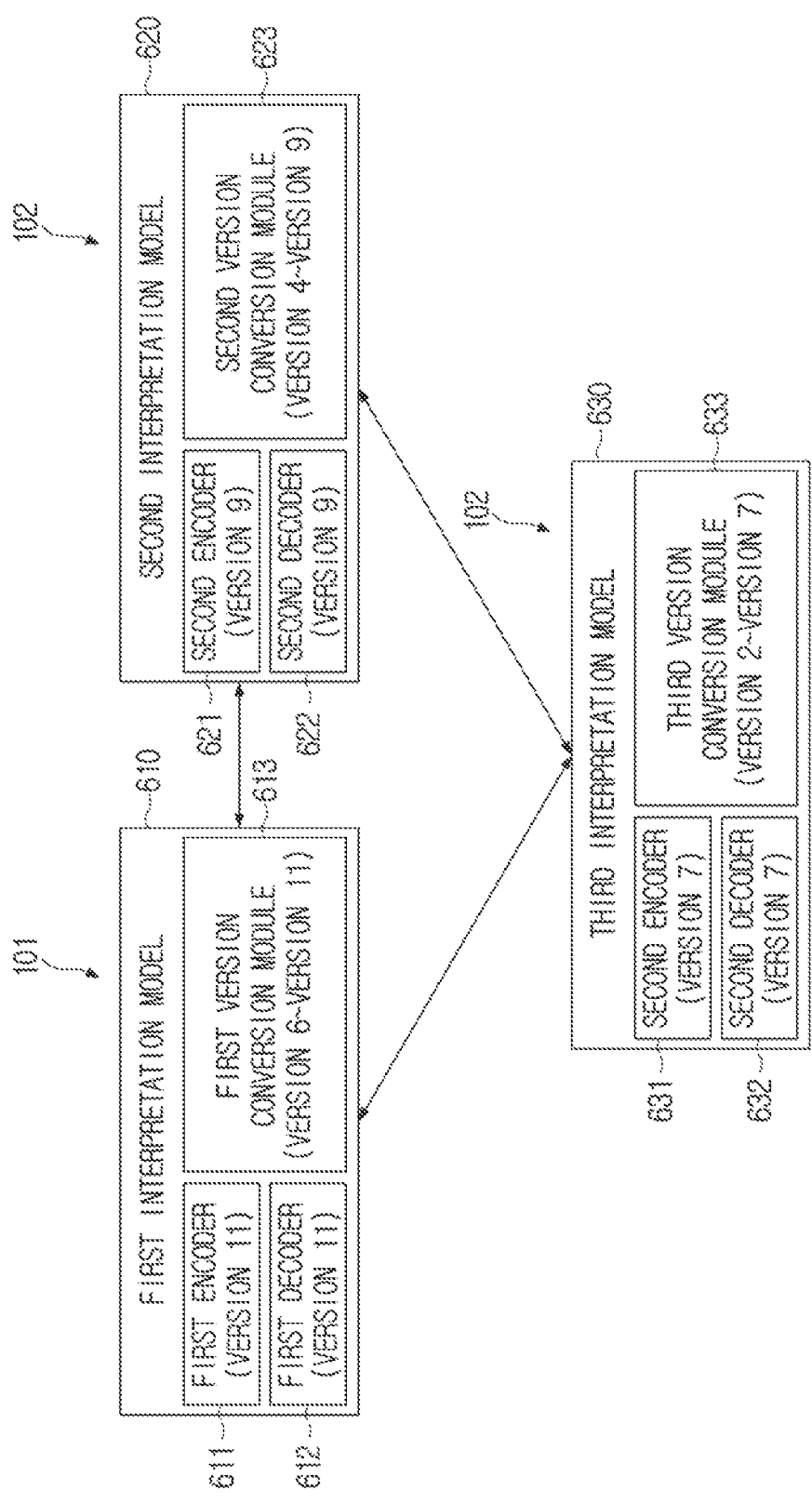
FIG. 6 is a diagram illustrating a method of determining compatibility and a method of obtaining compatibility according to an embodiment of the disclosure.

FIG. 6 is a diagram illustrating a method of determining compatibility and a method of obtaining compatibility according to an embodiment of the disclosure.

Referring to FIG. 6, performing a call among the first electronic apparatus 101, the second electronic apparatus 102, and the third electronic apparatus 103 may be performed. The configuration of the first electronic apparatus 101 and the second electronic apparatus 102 is the same as FIG. 5 and will not be further described.

The third electronic apparatus 103 may include a third interpretation model 630. The third interpretation model 630 may include a third encoder 631, a third decoder 632, and a third version conversion module 633. For example, the third version conversion module 633 may convert a feature vector from version 2 to version 7. The version of the third encoder 631 and the third decoder 632 may be version 7 which is the highest version among the version which the third version conversion module 63 may convert.

Since the version 6 and version 7 among the convertible versions of the first version conversion module 613 and the third version conversion module 633 are common, the first electronic apparatus 101 may determine that the first electronic apparatus 101 is compatible with the first interpretation model 610 and the third interpretation model 630. In addition, since version 4, version 5, version 6, and version 7 of the convertible versions of the second version conversion module 623 and the third version conversion module 633 are common, the second electronic apparatus 102 may determine that there is a compatibility between the second interpretation model 620 and the third interpretation model 630.

If it is determined that there are all compatibilities between the first electronic apparatus 101, the second electronic apparatus 102, and the third electronic apparatus 103, the first electronic apparatus 101 may obtain a compatible version based on the version information of the first interpretation model 610, the second interpretation model 620, and the third interpretation model 630. For example, the first electronic apparatus 101 may obtain the lowest version among the highest version which the version conversion module of each electronic apparatus may convert, as a compatible version. Referring to FIG. 5, the highest convertible version of the first version conversion module 613 is version 11, the highest convertible version of the second version conversion module 623 is version 9, and the highest convertible version of the third version conversion module 633 is version 7. The first electronic apparatus 101 may obtain version 7, which is the lowest version among version 11, version 9 and version 7, as a compatible version.

Figure 7:
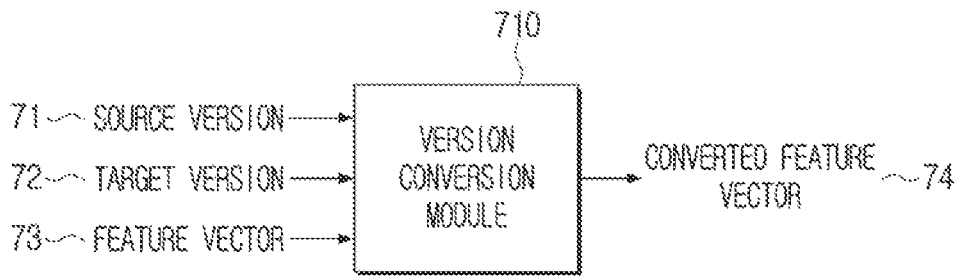
FIG. 7 is a diagram illustrating a method of converting a feature vector according to an embodiment of the disclosure.

FIG. 7 is a diagram illustrating a method of converting a feature vector according to an embodiment of the disclosure.

Referring to FIG. 7, the electronic apparatus 100 may obtain a feature vector 74 converted to correspond to the target version 72 by inputting information about the source version 71, the information about the target version 72, and the feature vector 73 to the version conversion module 710. The source version 71 and the target version 72 may vary depending on whether the vector conversion is performed while the electronic apparatus 100 is operating as a transmitting device or while the electronic apparatus 100 is operating as a receiving device.

If vector conversion is performed while the electronic apparatus 100 is operating as a transmitting device, the source version 71 is the version of the encoder stored in the electronic apparatus 100, and the target version 72 is a compatible version. Thus, referring to FIG. 3, the electronic apparatus 100 may obtain the second feature vector corresponding to the convertible version by inputting information about the version of the first encoder, information about the compatible version, and the first feature vector to the first version conversion module.

If vector conversion is performed while the electronic apparatus 100 is operating as a transmitting device, the source version 71 is a compatible version, and the target version 72 is the version of the decoder stored in the electronic apparatus 100. Referring to FIG. 4, the electronic apparatus 100 may obtain a fourth feature vector corresponding to the version of the first decoder by inputting the information on the compatible version, the information about the version of the first decoder, and the third feature vector into the first version conversion module.

Figure 8:
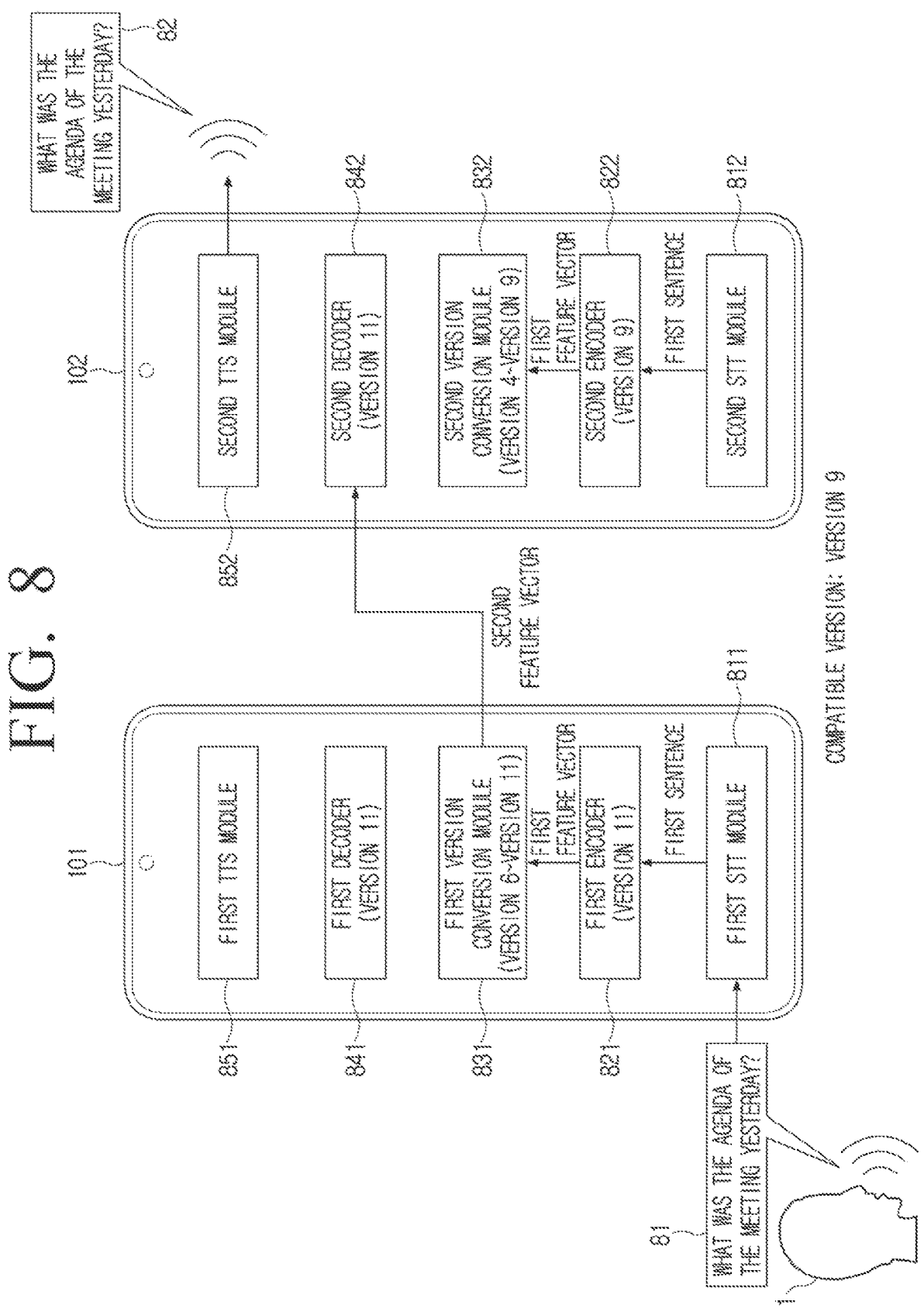
FIG. 8 is a diagram illustrating a call system according to an embodiment of the disclosure.
Figure 9:
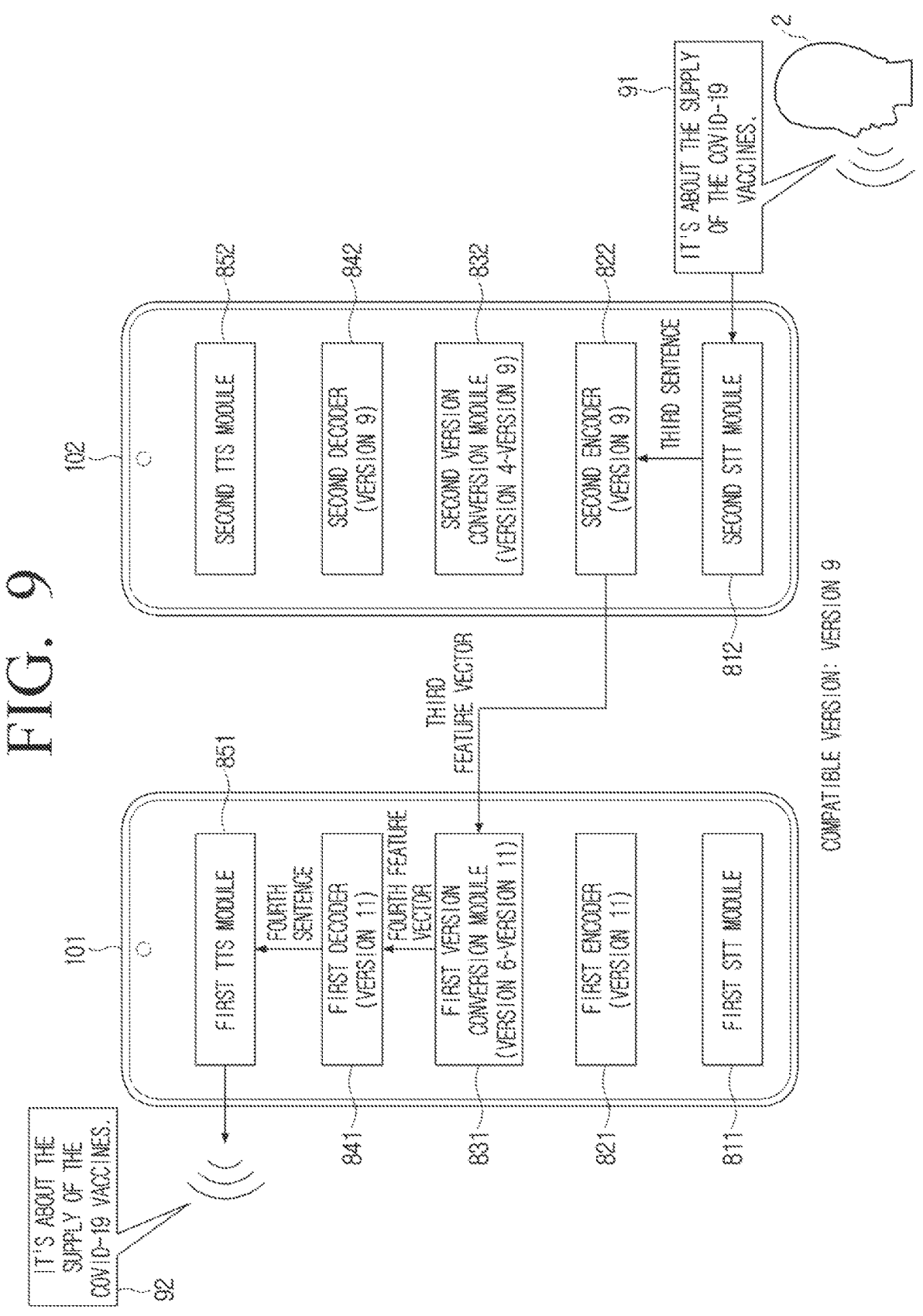
FIG. 9 is a diagram illustrating a call system according to an embodiment of the disclosure.

FIGS. 8 and 9 illustrate a call system according to an embodiment of the disclosure. The call system may include a first electronic apparatus 101 and a second electronic apparatus 102. The first electronic apparatus 101 and the second electronic apparatus 102 may include the same configuration as the electronic apparatus 100 of FIG. 2. The first electronic apparatus 101 may include a first STT module 811, a first encoder 821, a first version conversion module 831, a first decoder 841, and a first TTS module 851. The first encoder 821 and the first decoder 841 may be version 11. The convertible version of the first version conversion module 831 may be from version 6 to version 11. The second electronic apparatus 102 may include a second STT interpolation module 812, a second encoder 822, a second version conversion module 832, a second decoder 842, and a second TTS module 852. The version of the second encoder 822 and the second decoder 842 may be version 9. The convertible version of the second version conversion module 832 may be from version 4 to version 9. Thus, the compatible version of the first interpretation model of the first electronic apparatus 101 and the second interpretation model of the second electronic apparatus 102 may be version 9.

Each electronic apparatus constituting the call system may only store one encoder and one decoder corresponding to one language. For example, the first encoder 821 and the first decoder 841 may correspond to a first language (e.g., Korean). The first encoder 821 may be trained to generate a feature vector based on the text in the first language, and the first decoder 841 may be trained to generate a text of the first language based on an arbitrary feature vector. The second encoder 822 and the second decoder 842 may correspond to a second language (e.g., English). The second encoder 822 may be trained to generate a feature vector based on the text in the second language, and the second decoder 842 may be trained to generate a text of the second language based on an arbitrary feature vector.

Referring to FIG. 8, the first electronic apparatus 101 may obtain voice 81 of the first user 1 of the first language (e.g., Korean). The first electronic apparatus 101 may obtain first sentence by inputting the voice 81 to the first STT module

811. The electronic apparatus 101 may obtain the first feature vector by inputting the first sentence to the first encoder 821.

The first electronic apparatus 101 may determine whether to convert the first feature vector by determining whether the version of the first encoder 821 is the same as the convertible version. Referring to FIG. 8, the version of the first encoder 821 and the convertible version are different, so the first electronic apparatus 101 may convert the first feature vector to the second feature vector corresponding to the convertible version (that is, version 9) using the first version conversion module 831. The first electronic apparatus 101 may transmit the second feature vector to the second electronic apparatus 102.

The second electronic apparatus 102 may receive the second feature vector from the first electronic apparatus 101. The second electronic apparatus 102 may determine whether to convert the second feature vector by determining whether the convertible version and the version of the second decoder 842 are the same. Referring to FIG. 8, since the compatible version and the version of the second decoder 842 are the same, the second electronic apparatus 102 may not convert the second feature vector to another feature vector. If the compatible version and the version of the second decoder 842 were different, the second electronic apparatus 102 may have converted the second feature vector to a feature vector corresponding to the version of the second decoder 842 using the second version conversion module 832.

The second electronic apparatus 102 may obtain a second sentence in the second language (e.g., English) by inputting the second feature vector to the second decoder 842. The second electronic apparatus 102 may obtain voice 82 by inputting the second sentence to the second TTS module 852 and output the voice 82.

Referring to FIG. 9, the second electronic apparatus 102 may obtain the voice 91 of the second user 2. The second electronic apparatus 102 may input the voice 91 into the second STT module 812 to obtain a third sentence. By inputting the third sentence into the second encoder 822, the third feature vector may be obtained.

The second electronic apparatus 102 may determine whether to transform a third feature vector by determining whether the compatible version and the version of the second encoder 822 are the same. Referring to FIG. 9, since the compatible version and the version of the second decoder 822 are the same, the second electronic apparatus 102 may not convert the third feature vector to another feature vector. The second electronic apparatus 102 may transmit a third feature vector to the first electronic apparatus 101.

The first electronic apparatus 101 may receive a third feature vector from the second electronic apparatus 102. The first electronic apparatus 101 may determine whether the compatible version and the version of the first decoder 841 are the same to determine whether to convert the third feature vector. Referring to FIG. 9, since the compatible version and the version of the first decoder 841 are different, the first electronic apparatus 101 may convert the third feature vector to a fourth feature vector corresponding to the version of the first decoder 841 using the first version conversion module 831. The first electronic apparatus 101 may input a fourth feature vector to the first decoder 841 to obtain a fourth sentence of the first language. The first electronic apparatus 101 may input a fourth sentence to the first TTS module 851 to obtain a voice 92 and output the voice 92.

Figure 10:
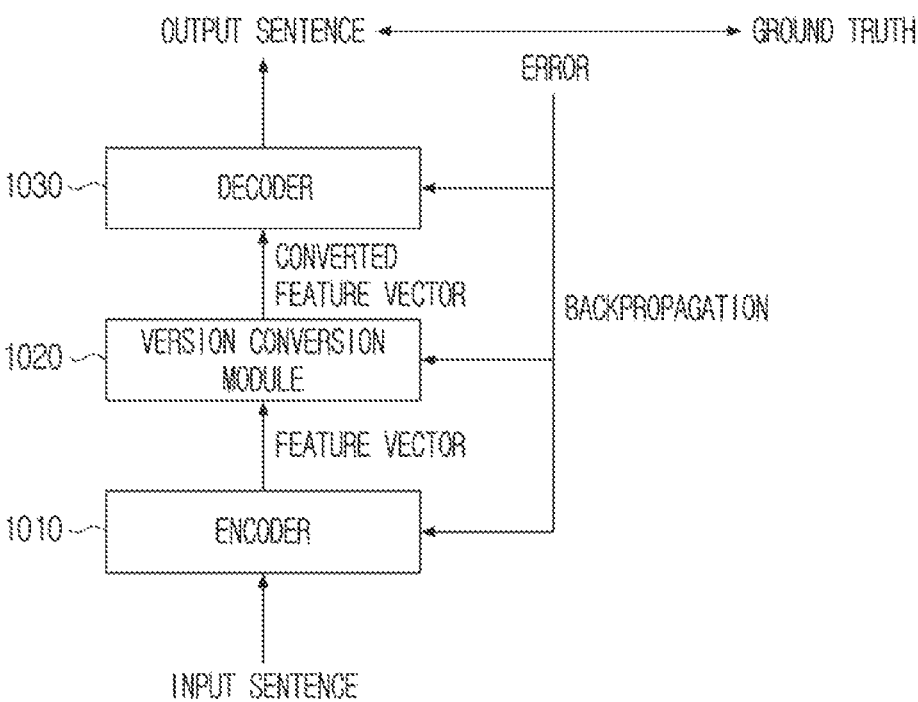
FIG. 10 is a diagram illustrating a learning method of an interpretation model according to an embodiment of the disclosure.

FIG. 10 is a diagram illustrating a learning method of an interpretation model according to an embodiment of the disclosure.

Referring to FIG. 10, a server/system for training the interpretation model may input an input sentence to the encoder 1010 to obtain a feature vector. The server may input the feature vector into the version conversion module 1020 to obtain the converted feature vector. The server may input the converted feature vector to the decoder 1030 to obtain an output sentence. The server may obtain errors based on output statements and ground truth. The server may use a predefined loss function to calculate an error. The server may update the parameters of the encoder, version conversion module, and decoder while repeating the above operations to minimize errors. For example, the server may use error backpropagation to update the weights of the encoder, version conversion module, and decoder.

Figure 11:
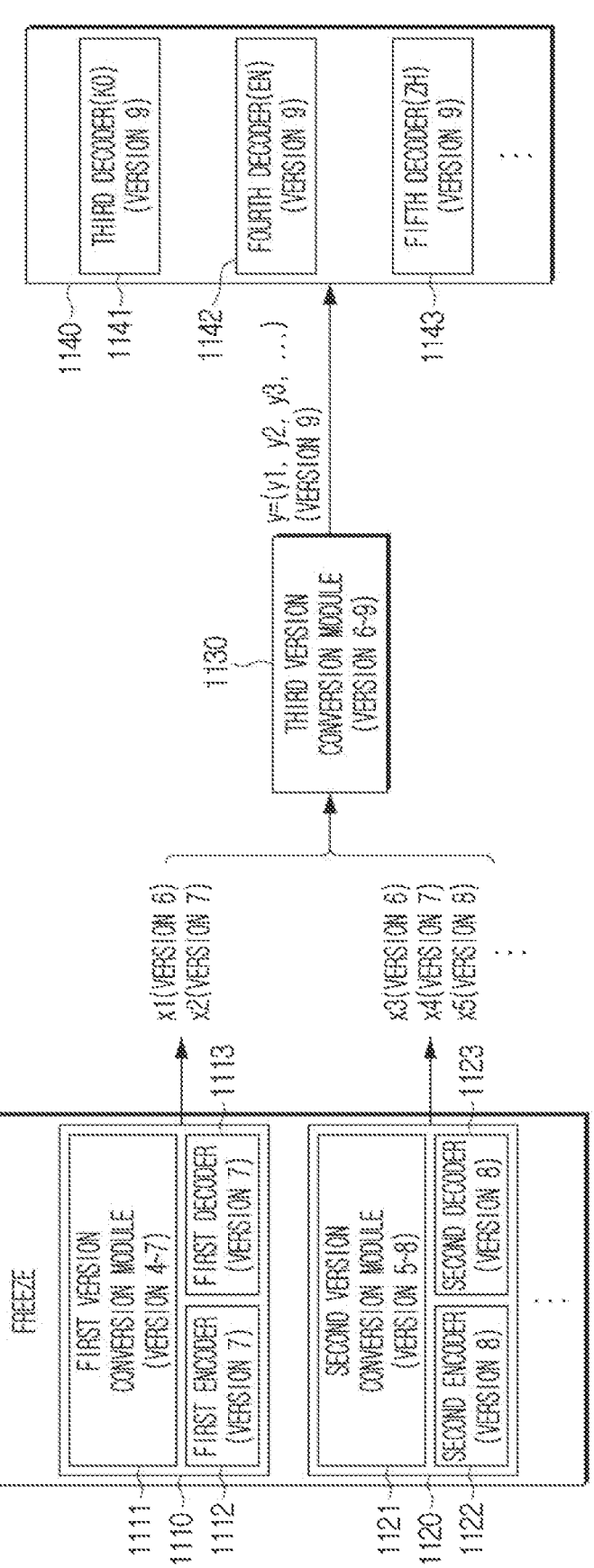
FIG. 11 is a diagram illustrating a version conversion module constituting an interpretation model and a method of learning a decoder according to an embodiment of the disclosure.

FIG. 11 is a diagram illustrating a version conversion module constituting an interpretation model and a method of learning a decoder according to an embodiment of the disclosure.

Referring to FIG. 11, the server may obtain learning data using previous versions of the interpretation models. The server may obtain the first feature vector x1 and the second feature vector x2 using the first interpretation model 1110. For example, the server may use the first encoder 1112 to obtain a second feature vector x2 corresponding to version 7. The server may convert the first feature vector x1 to a first feature vector x1 corresponding to version 6 using the first version conversion module 1111.

The server may obtain a third feature vector x3, a fourth feature vector x4, and a fifth feature vector x5 using the second interpretation model 1120. For example, the server may use the second encoder 1122 to obtain a fifth feature vector x5 corresponding to version 8. The server may use the second version conversion module 1121 to convert the fifth feature vector x5 to a third feature vector x3 corresponding to version 6. The server may convert the fifth feature vector x5 to a fourth feature vector x4 corresponding to version 7 using the second version conversion module 1121.

The server may train the third version conversion module 1130 and the decoder 1140 based on the feature vectors x1, x2, x3, x4, and x5. The decoder 1140 may include a third decoder 1141 corresponding to Korean, a fourth decoder 1142 corresponding to English, and a fifth decoder 1143 corresponding to Chinese. The server may input the feature vectors x1, x2, x3, x4, and x5 into the third version conversion module 1130 to obtain the feature vector y converted to correspond to version 9. The server may input a feature vector y into a plurality of decoders, respectively, included in the decoder 1140 to obtain text for each language.

The server may update the parameters of the plurality of decoders included in the decoder 1140 and the third version conversion module 1130 based on the obtained text and ground truth. While the third version conversion module 1130 and decoder 1140 are being trained, parameters of previous versions of the interpretation models of the previous versions, including the first interpretation model 1110 and the second interpretation model 1120, may be fixed.

Figure 12:
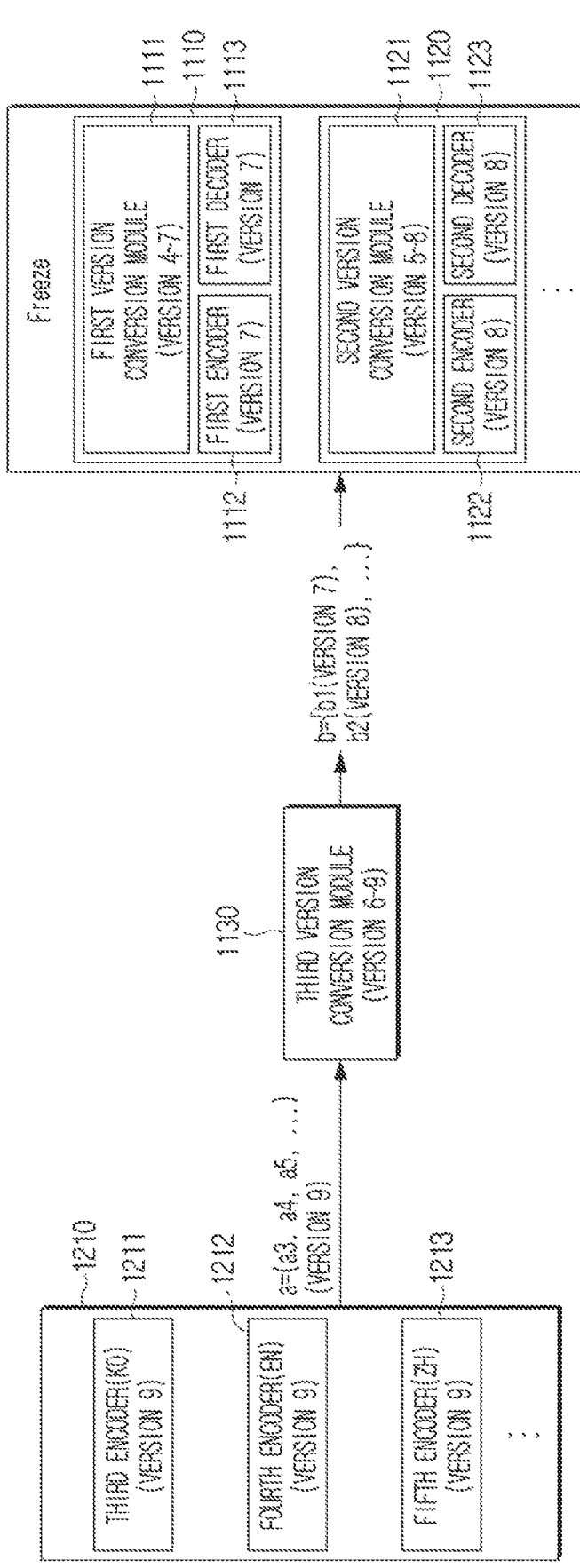
FIG. 12 is a diagram illustrating an encoder constituting an interpretation model and a learning meth od of a version conversion module according to an embodiment of the disclosure.

FIG. 12 is a diagram illustrating an encoder constituting an interpretation model and a learning method of a version conversion module according to an embodiment of the disclosure.

Referring to FIG. 12, the server may obtain a feature vector a3 using a third encoder 1211. The server may obtain a feature vector a4 using the fourth encoder 1212. The server may obtain a feature vector a5 using the fifth encoder 1213.

The server may input a feature vector a into the third version conversion module 1130 to obtain the converted feature vector b. For example, the server may obtain a feature vector b1 corresponding to version 7 and a feature vector b2 corresponding to version 8.

The server may input the converted feature vector b into previous versions of the interpretation models 1110, 1120 to obtain text corresponding to the feature vector b. The server may update the parameters included in the encoders 1211, 1212, 1213 and the third version conversion module 1130 based on the obtained text and ground truth. While the third version conversion module 1130 and encoder 1210 are being trained, the parameters of previous versions of the interpretation models of the previous version, including the first interpretation model 1110 and the second interpretation model 1120, may be fixed.

Figure 13:
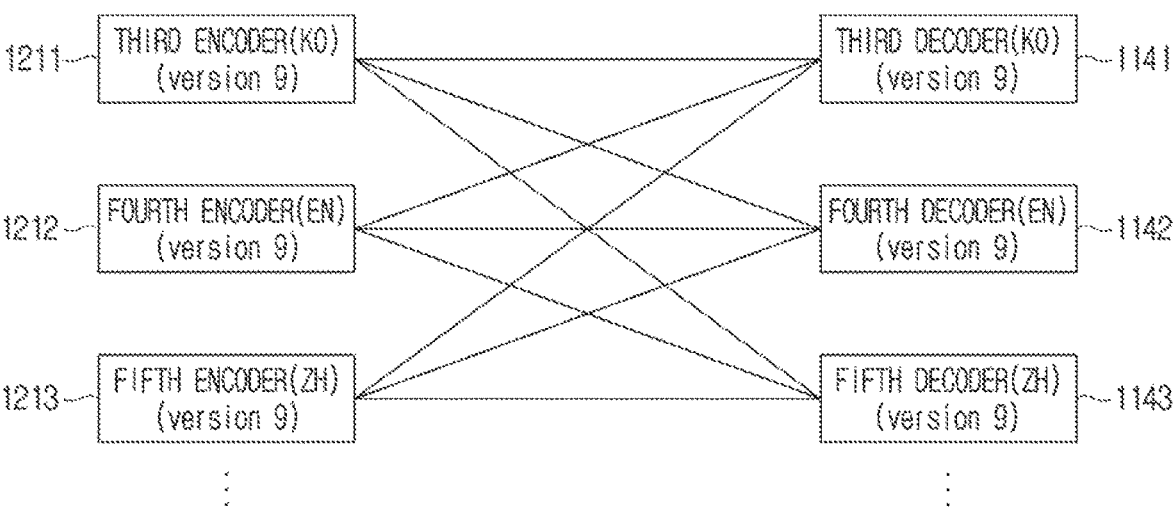
FIG. 13 is a diagram illustrating a learning method of an encoder and a decoder corresponding to an interpretation model according to an embodiment of the disclosure.

FIG. 13 is a diagram illustrating a learning method of an encoder and a decoder corresponding to an interpretation model according to an embodiment of the disclosure.

Referring to FIG. 13, the versions of the encoders 1211, 1212, and 1213 and the versions of the decoders 1141, 1142, and 1143 may be the same. The server may input a plurality of first sentences into each of the encoders 1211, 1212, and 1213 to obtain a plurality of feature vectors. The server may obtain a plurality of second sentences by inputting the obtained plurality of feature vectors into each of the decoders 1141, 1142, and 1143. The server may update the parameters of the encoders 1211, 1212, 1213 and decoders 1141, 1142, 1143 based on a plurality of second sentence and ground truth. The server may train the interpretation model by randomly and repeatedly performing the learning methods of FIGS. 11 to 13.

FIG. 14 is a flowchart illustrating a method of controlling an electronic apparatus according to an embodiment of the disclosure.

Referring to FIG. 14, the electronic apparatus 100 may store information store information about first interpretation model including first encoder, first decoder, and first version conversion module and at least one first version that first version conversion module may convert in operation S1410. The version of the first encoder and the first decoder may be the highest among at least one first version.

The electronic apparatus 100 may perform communication connection with the external device 200 and receive information, from the external device 200, about at least one convertible second version of the second version conversion module included in the second interpretation model stored in the external device 200 in operation S1420.

The electronic apparatus 100 may obtain and store information about the compatible version based on information about at least one first version and information about at least one second version in operation S1430. The electronic apparatus 100 may identify the lower between the highest version of at least one first version and the highest version of at least one second version as a compatible version.

Once the user voice 11 is obtained, the electronic apparatus 100 may use a first encoder to obtain a first feature vector corresponding to the user voice 11 in operation S1440. The electronic apparatus 100 may convert the first feature vector to a second feature vector corresponding to the compatible version using the first version conversion module, and may transmit the second feature vector to an external device 200 in operation S1460. If the highest of at least one first version is lower than the highest version of at least one second version, the versions of the first feature vector and the second feature vector may be the same.

The electronic apparatus 100 may receive a third feature vector corresponding to the voice of another user obtained by the external device 200 from the external device 200 and based on a compatible version. The electronic apparatus 100 may determine whether the version of the first decoder is the same as the compatible version. If the version of the first decoder is the same as the compatible version, the electronic apparatus 100 may use the first decoder to obtain text corresponding to the third feature vector. If the version of the first decoder differs from the compatible version, the electronic apparatus 100 may use the first version conversion module to convert the third feature vector to the fourth feature vector corresponding to the version of the first decoder, and use the first decoder to obtain text corresponding to the fourth feature vector.

The electronic apparatus 100 may receive identification information of the external device 200. The electronic apparatus 100 may match information identification information of the external device 200 with information of the compatible version and store the information in the memory. When the electronic apparatus 100 performs a telephone call again with an external device 200 that has a history of performing a telephone call, the electronic apparatus 100 may identify a compatible version corresponding to the external device 200 based on the identification information of the external device 200. The electronic apparatus 100 may identify a compatible version corresponding to the external device 200 in memory without performing the above-described compatibility determination operation (e.g., S320) and the compatible version acquisition operation (e.g., S330).

Meanwhile, the various embodiments described above may be implemented in a recording medium readable by a computer or a similar device using software, hardware, or a combination thereof. In some cases, the embodiments described herein may be implemented by the processor itself. According to the software implementation, embodiments such as procedures and functions described in this specification may be implemented as separate software modules. Each of the software modules may perform one or more functions and operations described herein.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device.

The non-transitory computer-readable medium does not refer to a medium that stores data for a short period of time, such as a register, cache, memory, etc., but semi-permanently stores data and is available of reading by the device. For example, the non-transitory computer-readable medium may be CD, DVD, a hard disc, Blu-ray disc, USB, a memory card, ROM, or the like.

A machine-readable storage medium may be provided in the form of a non-transitory storage medium. Herein, the term "non-transitory" only denotes that a storage medium does not include a signal (e.g., electromagnetic wave) but is tangible, and does not distinguish the case in which a data is semi-permanently stored in a storage medium from the case in which a data is temporarily stored in a storage medium. For example, "non-transitory storage medium" may include a buffer in which data is temporarily stored.

According to various embodiments, a method disclosed herein may be provided in a computer program product. A computer program product may be traded between a seller and a purchaser as a commodity. A computer program product may be distributed in the form of a machine readable storage medium (e.g., compact disc ROM (CD-ROM)) or distributed online through an application store (e.g., Play-Store™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium such as a manufacturer's server, a server in an application store, or a memory in a relay server.

While example embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims and their equivalents. Also, it is intended that such modifications are not to be interpreted independently from the technical idea or prospect of the disclosure.

What is claimed is:

1. An electronic apparatus comprising:
a microphone;
a communication interface including communication circuitry;
a memory storing first information associated with each of: a first encoder, a first decoder, a first interpretation model including a first version conversion module, and at least one first version which the first version conversion module is able to convert, wherein a version of the first encoder and a version of the first decoder is a highest version among the at least one first version; and
a processor configured to:
communicate, via the communication interface, with an external device and receive, from the external device, second information associated with at least one second version which a second version conversion module included in a second interpretation model stored in the external device is able to convert,
obtain compatibility information associated with a compatible version based on the at least one first version and the least one second version and store the compatibility information in the memory,
based on a user voice being obtained through the microphone, obtain a first feature vector corresponding to the user voice using the first encoder,
convert the first feature vector to a second feature vector corresponding to the compatible version using the first version conversion module, and
transmit, via the communication interface, the second feature vector to the external device.

2. The electronic apparatus of claim 1, wherein the processor is further configured to identify a highest version included in both the at least one first version and the at least one second version as the compatible version.

3. The electronic apparatus of claim 1, wherein, based on the highest version among the at least one first version being lower than a highest version among the at least one second version, a version of the first feature vector and a version of the second feature vector are identical.

4. The electronic apparatus of claim 1, wherein the processor is further configured to:

receive, from the external device, a third feature vector corresponding to a voice of a second user obtained by the external device and is based on the compatible version,
determine whether the version of the first decoder is identical with the compatible version, and
obtain a text corresponding to the voice of the second user based on the determination result.

5. The electronic apparatus of claim 4, wherein the processor is further configured to:
based on the version of the first decoder being identical with the compatible version, obtain a text corresponding to the third feature vector using the first decoder, and
based on the version of the first decoder being different from the compatible version, convert the third feature vector to a fourth feature vector corresponding to the version of the first decoder using the first version conversion module, and obtain a text corresponding to the fourth feature vector using the first decoder.

6. The electronic apparatus of claim 1, wherein the processor is further configured to:
determine compatibility with the external device based on a comparison of the at least one first version and the at least one second version, and
based on determining that the electronic apparatus is not compatible with the external device, output a message requesting update of the first interpretation model.

7. The electronic apparatus of claim 1, wherein the processor is further configured to:
based on communication with the external device, receive identification information of the external device, and
match the identification information of the external device with the compatibility information associated with the compatible version and store the information in the memory.

8. A method for controlling an electronic apparatus, the method comprising:
storing first information associated with each of: a first encoder, a first decoder, a first interpretation model including a first version conversion module, and at least one first version which the first version conversion module is able to convert, wherein a version of the first encoder and a version of the first decoder is a highest version among the at least one first version;
communicating with an external device and receiving, from the external device, second information about at least one second version which a second version conversion module included in a second interpretation model stored in the external device is able to convert;
obtaining compatibility information associated with a compatible version based on the at least one first version and the least one second version and storing the compatibility information;
based on a user voice being obtained, obtaining a first feature vector corresponding to the user voice using the first encoder;
converting the first feature vector to a second feature vector corresponding to the compatible version using the first version conversion module; and
transmitting the second feature vector to the external device.

9. The method of claim 8, wherein the obtaining the compatibility information associated with the compatible version comprises:

identifying a highest version included in both the at least one first version and the at least one second version as the compatible version.

10. The method of claim 8, wherein, based on the highest version among the at least one first version being lower than a highest version among the at least one second version, a version of the first feature vector and a version of the second feature vector are identical.

11. The method of claim 8, further comprising:

receiving, from the external device, a third feature vector corresponding to a voice of a second user obtained by the external device and is based on the compatible version;

determining whether the version of the first decoder is identical with the compatible version; and obtaining a text corresponding to the voice of the second user based on the determination result.

12. The method of claim 11, wherein the obtaining the text comprises:

based on the version of the first decoder being identical with the compatible version, obtaining a text corresponding to the third feature vector using the first decoder; and based on the version of the first decoder being different from the compatible version, converting the third feature vector to a fourth feature vector corresponding to the version of the first decoder using the first version conversion module, and obtaining a text corresponding to the fourth feature vector using the first decoder.

13. The method of claim 8, further comprising:

determining compatibility with the external device based on a comparison of the at least one first version and the at least one second version; and based on determining that the electronic apparatus is not compatible with the external device, outputting a message requesting update of the first interpretation model.

14. A non-transitory computer readable medium for storing computer readable program code or instructions for carrying out operations, when executed by a processor, for providing real-time interpretation during a conversation, the operations comprising:

storing first information associated with each of: a first encoder, a first decoder, a first interpretation model including a first version conversion module, and at least one first version which the first version conversion module is able to convert, wherein a version of the first encoder and a version of the first decoder is a highest version among the at least one first version;

communicating with an external device and receiving, from the external device, second information associated with at least one second version which a second version conversion module included in a second interpretation model stored in the external device is able to convert;

obtaining compatibility information associated with a compatible version based on the at least one first version and the least one second version and storing the compatibility information;

based on a user voice being obtained, obtaining a first feature vector corresponding to the user voice using the first encoder;

converting the first feature vector to a second feature vector corresponding to the compatible version using the first version conversion module; and transmitting the second feature vector to the external device.

15. The non-transitory computer readable medium of claim 14, wherein the obtaining the compatibility information associated with the compatible version comprises:

identifying a lower version between a highest version among the at least one first version and a highest version among the at least one second version as the compatible version.

16. The non-transitory computer readable medium of claim 14, wherein the operations further comprise:

receiving, from the external device, a third feature vector corresponding to a voice of a second user obtained by the external device and is based on the compatible version;

determining whether the version of the first decoder is identical with the compatible version; and obtaining a text corresponding to the voice of the second user based on the determination result.

17. The non-transitory computer readable medium of claim 16, wherein the obtaining the text comprises:

based on the version of the first decoder being identical with the compatible version, obtaining a text corresponding to the third feature vector using the first decoder; and based on the version of the first decoder being different from the compatible version, converting the third feature vector to a fourth feature vector corresponding to the version of the first decoder using the first version conversion module, and obtaining a text corresponding to the fourth feature vector using the first decoder.

18. The non-transitory computer readable medium of claim 14, wherein the operations further comprise:

determining compatibility with the external device based on a comparison of the at least one first version and the at least one second version; and based on determining that the external device is not compatible, outputting a message requesting update of the first interpretation model.

* * * * *